(12) United States Patent
Qu

(10) Patent No.: US 9,229,500 B2
(45) Date of Patent: Jan. 5, 2016

(54) ACOUSTIC NOISE REDUCTION IN POWER SUPPLY INDUCTORS

(75) Inventor: Dayu Qu, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 1318 days.

(21) Appl. No.: 13/019,233

(22) Filed: Feb. 1, 2011

(65) Prior Publication Data

US 2011/0121928 A1 May 26, 2011

Related U.S. Application Data

(62) Division of application No. 11/875,695, filed on Oct. 19, 2007, now Pat. No. 7,915,987.

(51) Int. Cl.
*H01F 27/29* (2006.01)
*H01F 27/02* (2006.01)
*G06F 1/16* (2006.01)
*H02M 7/00* (2006.01)
*G06F 1/26* (2006.01)
*H01F 27/33* (2006.01)
*H01F 41/02* (2006.01)

(52) U.S. Cl.
CPC *G06F 1/26* (2013.01); *H01F 27/33* (2013.01); *H01F 41/0246* (2013.01); *Y10T 29/4902* (2015.01)

(58) Field of Classification Search
CPC ....... H01F 27/33; H01F 27/255; H01F 27/29; H01F 27/30; H01F 27/306; H01F 27/292; H01F 41/0246; H01F 41/10; H01F 3/08; H01F 17/04; H01F 17/041; G06F 1/26; Y10T 29/4902

USPC ................. 336/65, 96, 100, 192, 83; 363/123
See application file for complete search history.

(56) References Cited

U.S. PATENT DOCUMENTS

| | | | |
|---|---|---|---|
| 6,590,487 B2 | 7/2003 | Uchiyama | |
| 7,412,766 B2* | 8/2008 | Shiu | B29C 43/18 228/175 |
| 7,551,053 B2 | 6/2009 | Yamashita | |
| 2001/0016977 A1 | 8/2001 | Moro | |
| 2002/0158739 A1 | 10/2002 | Shibata | |
| 2004/0066265 A1 | 4/2004 | Saito | |
| 2006/0049907 A1 | 3/2006 | Liu | |
| 2008/0012674 A1 | 1/2008 | Sano | |
| 2008/0307242 A1* | 12/2008 | Qu | H02J 9/005 713/320 |
| 2009/0085703 A1* | 4/2009 | Liu | H01F 17/04 336/192 |
| 2011/0179292 A1* | 7/2011 | Clegg | G06F 1/26 713/300 |

* cited by examiner

*Primary Examiner* — Mangtin Lian
(74) *Attorney, Agent, or Firm* — Blank Rome LLP

(57) ABSTRACT

Embodiments of the present invention provide an apparatus that reduces an audible noise produced in a power supply. The apparatus includes: (1) a housing; (2) an inductor coil formed from a coil of wire enclosed in the housing; (3) a set of wires that are coupled from the inductor coil to the outside of the housing through corresponding apertures in the housing, comprising electrical leads for the inductor coil; and (4) a predetermined amount of adhesive in the apertures that bonds the wires to the housing to reduce an audible noise produced when the current through the inductor coil is cycled quickly.

11 Claims, 7 Drawing Sheets

ACOUSTIC NOISE REDUCTION IN POWER SUPPLY INDUCTORS

RELATED APPLICATIONS

This application is a divisional application of, and hereby claims priority under 35 U.S.C. §120 to, pending U.S. patent application Ser. No. 11/875,695, entitled "Acoustic Noise Reduction in Power Supply Inductors," filed 19 Oct. 2007, by Dayu Qu.

BACKGROUND

1. Field of the Invention

Embodiments of the present invention relate to electronic circuits and power supplies. More specifically, embodiments of the present invention relate to techniques for reducing acoustic noise from power supply inductors.

2. Related Art

Many modern computer systems operate under strict power consumption limitations. In order to meet these limitations, some computer systems support one or more low-power modes in which some of the computer's components operate using less power or are disabled. For example, during a low-power mode, the computer system's hard drives can be stopped, the display can be deactivated, and/or the CPU clock can be slowed down.

When operating in full-power mode, the computer system draws current from a power supply according to the load on the computer system. For example, FIG. 1A presents a graph illustrating a current-flow pattern during full-power mode. As can be seen from FIG. 1A, the computer system draws different levels of power for different loads. For example, when a user loads a program from disk into memory, the disk, the memory, and the CPU are all activated. Hence, power usage increases, which increases the current drawn from the power supply. When the computer system subsequently finishes loading the program from disk, there is a corresponding decrease in the current drawn from the power supply.

When operating in low-power mode, the computer system can disable all but a minimal subset of computer system components. For example, the low-power mode may be a "sleep mode," wherein all components are deactivated except a hardware monitor that is designed to wake the computer system upon receiving a communication from a peripheral (e.g., a keystroke or mouse movement). During the low-power mode, the computer system draws a small fraction of the power drawn during full-power mode. For example, FIG. 1B presents a graph illustrating a current-flow pattern during a low-power mode.

Some computer systems support a hybrid mode, which limits power consumption by dynamically disabling and re-enabling computer system components and features as they are used. Although the components and features are sometimes disabled in the hybrid mode, the computer system appears to be fully functional. For example, in some hybrid modes, the computer system may slow down the CPU clock when a user is not performing operations that require the full CPU power. In some systems, during the hybrid mode the computer system cycles between a specialized low-power mode and full-power mode at every opportunity (e.g., between keystrokes). For example, FIG. 1C presents a graph illustrating a current-flow pattern during a hybrid low-power/full-power mode. As shown in FIG. 1C, the computer system is subject to significant current swings during the hybrid mode (i.e., high di/dt).

Unfortunately, some computer systems include parts in the power supply that perform inadequately during such hybrid modes. For example, in some power supplies, an inductor will produce a clearly audible whine caused by the high di/dt when cycling back and forth between low-power mode and full-power mode. Because there are often limitations on the noise that computer systems (particularly laptops) may emit, an audible whine from the power supply may be unacceptable.

Hence, what is needed is a power supply for a computer system without the above-described problem.

SUMMARY

Embodiments of the present invention provide an apparatus that reduces an audible noise produced in a power supply. The apparatus includes: (1) a casing; (2) an inductor coil formed from a coil of wire enclosed in the casing; (3) a set of wires that are coupled from the inductor coil to the outside of the casing through corresponding apertures in the casing comprising electrical leads for the inductor coil; and (4) a predetermined amount of adhesive in the apertures that bonds the wires to the casing to reduce an audible noise produced when the current through the inductor coil is cycled quickly.

In some embodiments, the set of wires extend along the casing from the corresponding set of apertures and under the casing alongside an outside surface of the casing forming "J" leads for coupling the inductor coil to an electrical circuit.

In some embodiments, a mechanical mount is coupled to the outside of the casing on an opposite side of the casing from the set of apertures.

In some embodiments, the casing is formed by press-fitting metal dust powder around the inductor coil.

Embodiments of the present invention provide a method for manufacturing an inductor for reducing an audible noise in an electrical circuit. During the process, an inductor coil is first wound from a segment of wire. Next, the wound inductor coil is enclosed in metal dust powder. The metal dust powder is then press-fit into a casing for the inductor, wherein a set of wires are coupled from the inductor coil to the outside of the casing through a corresponding set of apertures in the casing (to serve as electrical leads for the inductor coil). Next, a predetermined amount of adhesive is placed in the apertures to bond the wires to the casing to reduce an audible noise produced when the current through the circuit element is cycled quickly.

Embodiments of the present invention provide a computer system for reducing an audible noise produced in a power supply. The computer system includes a processor and a power supply that provides power to the processor. The power system includes: (1) a casing; (2) an inductor coil formed from a coil of wire enclosed in the casing; (3) a set of wires that are coupled from the inductor coil to the outside of the casing through corresponding apertures in the casing, wherein the wires form electrical leads for the inductor coil; and (4) a predetermined amount of adhesive in the apertures that bonds the wires to the casing to reduce an audible noise produced when the current through the inductor coil is cycled quickly.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the claims.

Computer System

Figure 1A:
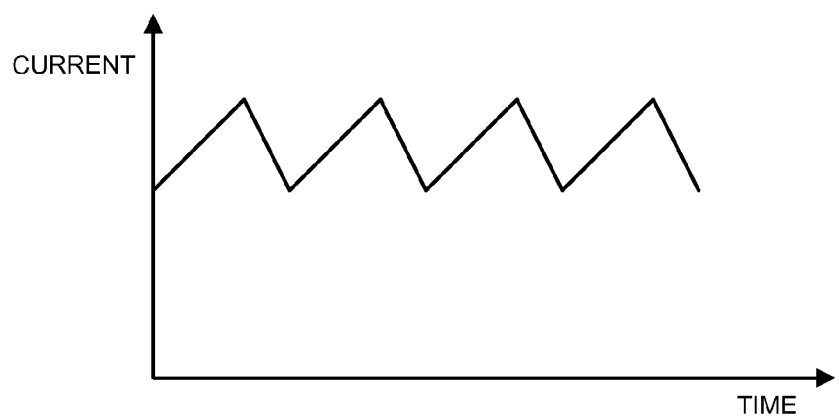
FIG. 1A presents a graph illustrating a current-flow pattern during a full-power mode in a computer system.
Figure 1B:
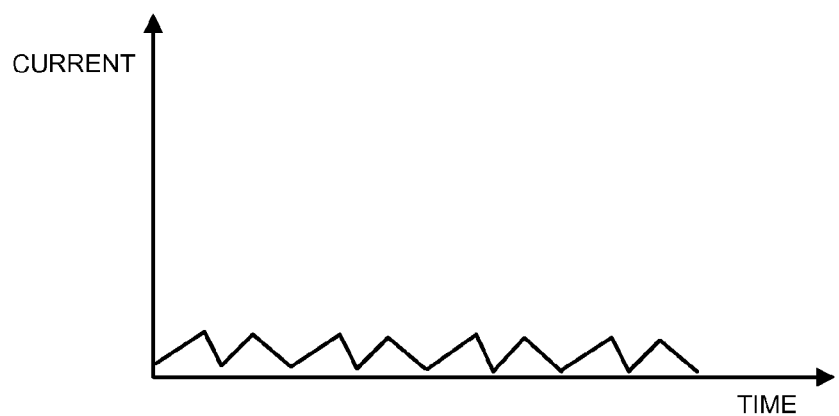
FIG. 1B presents a graph illustrating a current-flow pattern during a low-power mode in a computer system.
Figure 1C:
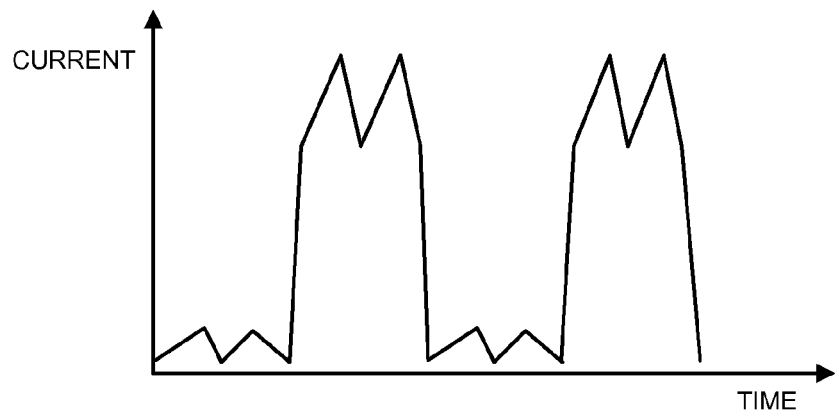
FIG. 1C presents a graph illustrating a current-flow pattern during a hybrid low-power/full-power mode.
Figure 2A:
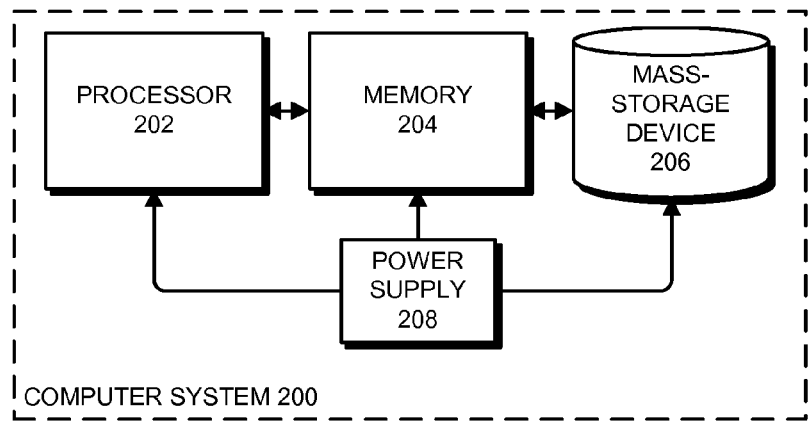
FIG. 2A presents a block diagram of a computer system in accordance with embodiments of the present invention.

FIG. 2A presents a block diagram of a computer system 200 in accordance with embodiments of the present invention. Computer system 200 includes processor 202, memory 204, and mass-storage device 206. Computer system 200 also includes power supply 208, which supplies electrical power to processor 202, memory 204, mass-storage device 206, and other components in computer system 200 (not shown)

In some embodiments of the present invention, computer system 200 is a general-purpose computer system that supports low-power modes, including sleep, idle, and/or standby modes. During these low-power modes, some or all of the functions and/or components of computer system 200 are slowed down or disabled to conserve power. For example, when operating in a low-power mode, computer system 200 may slow down or disable processor 202, memory 204, mass-storage device 206, and/or other devices such as monitors and peripheral devices (not shown).

In embodiments of the present invention, computer system 200 also supports one or more "hybrid" modes in which computer system 200 appears to be in full-power mode, but instead dynamically switches from a full-power mode to one or more special low-power modes as conditions permit. For example, computer system 200 may slow down the CPU clock and/or other system clocks whenever the load on the CPU and other components is low, but may restore the CPU clock and/or other system clocks when the load increases. In some embodiments, computer system 200 can enter and exit a special low-power mode very rapidly, facilitating a nearly continuous switch between the modes. For example, when a user is editing a document, computer system 200 may generally operate in full-power mode, but as often as between keystrokes computer system 200 may enter the specialized low-power mode.

In FIG. 2A, processor 202 is a central processing unit (CPU) that processes instructions for computer system 200. For example, processor 202 can be a microprocessor, a device controller, or other type of computational engine. Memory 204 is volatile memory that stores instructions and data for processor 202 during operation of computer system 200. For example, memory 204 can include DRAM, SDRAM, or another form of volatile memory. Mass-storage device 206 is a non-volatile storage device that stores instructions and data for processor 202. For example, mass-storage device 206 can be a hard disk drive, a flash memory, an optical drive, or another non-volatile storage device.

Note that although we describe embodiments of the present invention using computer system 200, alternative embodiments can be used within other types of computing systems. Moreover, embodiments of the present invention are operable in any type of electronic device wherein a circuit element produces an audible noise caused by significant di/dt.

Power Supply

Figure 2B:
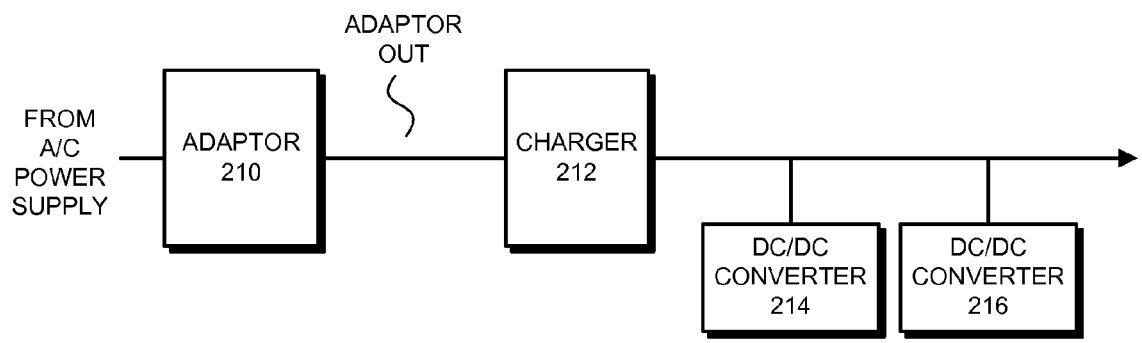
FIG. 2B presents a block diagram of a power supply in a computer system in accordance with embodiments of the present invention.

FIG. 2B presents a block diagram of a power supply in computer system 200 in accordance with embodiments of the present invention. The power supply includes adaptor 210, charger 212, and a set of DC/DC converters 214 and 216 (i.e., voltage regulators).

Adapter 210 converts an AC signal from a power source (e.g., a common 120 VAC electrical outlet) to a 16.5 VDC signal which is in turn converted by charger 212 into a 12.6 VDC signal. The 12.6 VDC signal is then used as an input for DC/DC converters 214. The 12.6 VDC signal can also be used to charge a battery (not shown) if there is a battery present in the system.

Figure 2C:
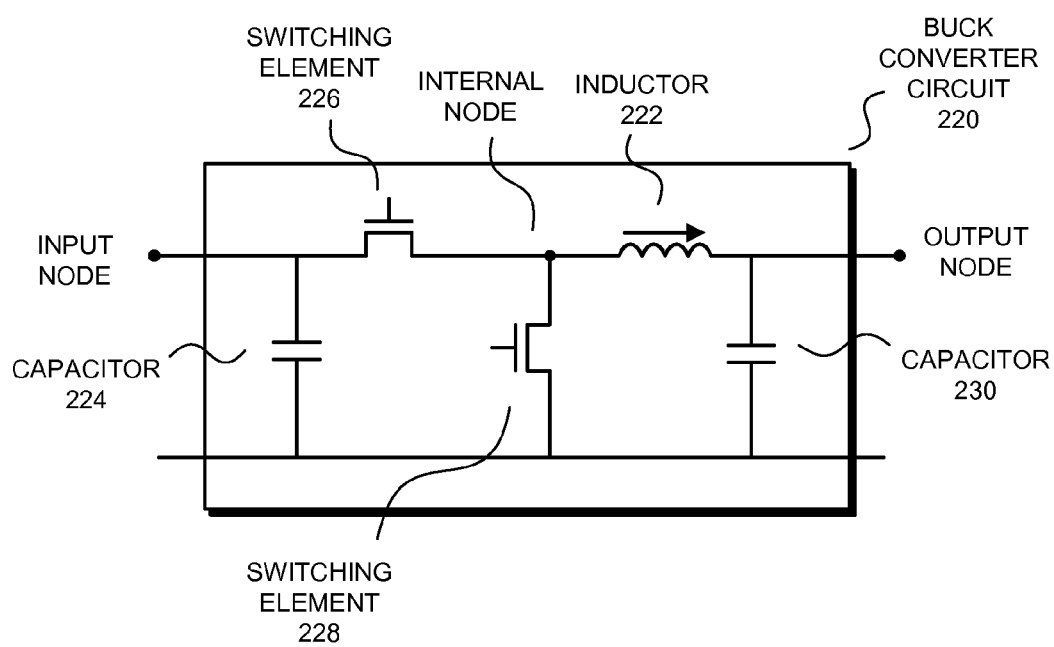
FIG. 2C presents a circuit diagram illustrating a buck converter circuit in accordance with embodiments of the present invention.

FIG. 2C presents a circuit diagram illustrating a buck converter circuit 220 in accordance with embodiments of the present invention. Buck converter circuit 220 is a switched-mode step-down DC-to-DC converter. Note that charger 212 includes a buck converter circuit 220.

Buck converter circuit includes inductor 222, capacitors 224 and 230, and switching elements 226 and 228. The operation of the circuit elements in the buck circuit is known in the art, hence a more detailed description is not provided. Note that in some embodiments of the present invention, both switching element 226 and 228 are transistors. However, in alternative embodiments, switching element 226 is a transistor while switching element 228 is a diode or another such circuit element.

Inductor

Figure 3A:
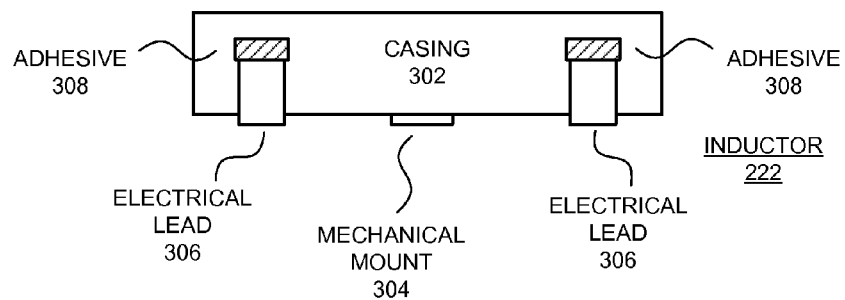
FIG. 3A presents a front view of an inductor in accordance with embodiments of the present invention.
Figure 3B:
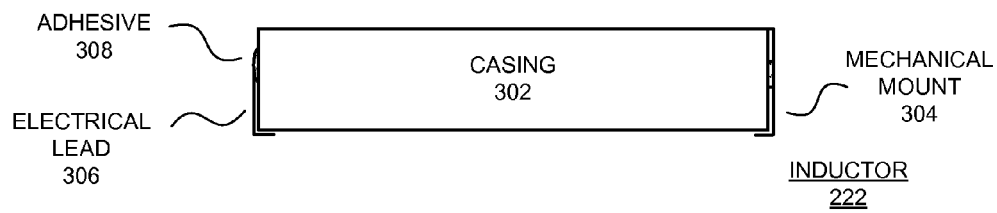
FIG. 3B presents a side view of an inductor in accordance with embodiments of the present invention.
Figure 3C:
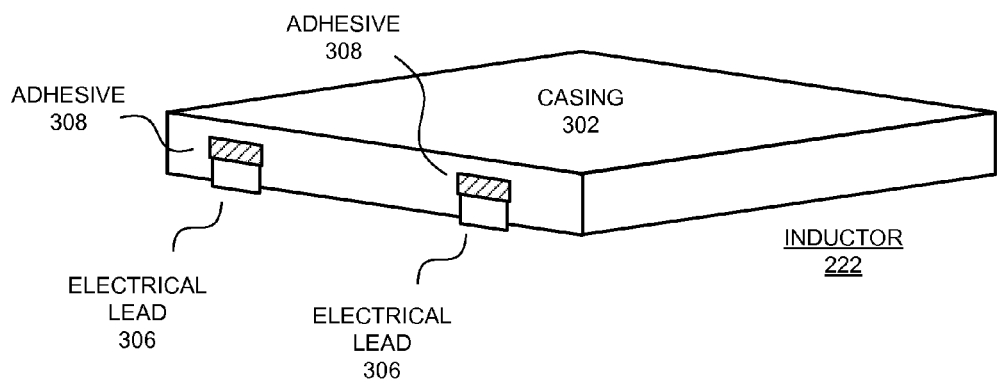
FIG. 3C presents an isometric view of an inductor in accordance with embodiments of the present invention.

FIG. 3A-3C present front, side, and isometric external views of an inductor 222 in accordance with embodiments of the present invention. Inductor 222 includes casing 302, electrical leads 306, and mechanical mount 304.

In some embodiments of the present invention, casing 302 is formed from press-fit metal dust powder. In these embodiments, inductor coil 400 (see FIG. 4) is formed from a segment of wire. Inductor coil 400 is then enclosed in metal dust powder, which is pressed into the final shape of casing 302. When pressing the metal dust powder around inductor coil 400, a pressure of several tons of force per square inch is used. Although there are multiple forms of metal dust powder that may be used to form casing 302, forming an inductor casing from metal dust powder is known in the art and is therefore not described in more detail. Note that although we describe embodiments of the present invention that use press-fitting to form the casing, alternative embodiments use sintering or other techniques to form the casing from the metal dust powder.

In some embodiments, casing 302 is a small-outline j-lead (SOJ) package for surface-mounting inductor 222. Hence, as shown in FIGS. 3A-3C, electrical leads 306 extend out of an aperture in the side of casing 302, then run alongside casing 302, and under casing 302 as shown in FIG. 3B (i.e., the leads appear as a "J"). In addition, mechanical mount 304 is bonded to the outside of casing 302 on the opposite side of casing 302 from electrical leads 306. Mechanical mount 304 runs alongside casing 302, and under casing 302 as shown in FIG. 3B (i.e., also appearing as a "J"). Note that although we describe embodiments of the present invention using the SOJ package, in alternative embodiments, casing 302 is in another packaging format.

When placed in an electrical circuit, inductor 222 is mounted by bonding (e.g., soldering) electrical leads 306 and mechanical mount 304 to a mounting surface. In some embodiments of the present invention, mechanical mount 304 has no electrical function and serves only as a third mounting point for inductor 222 in order to provide mechanical stability.

Inductor 222 also includes adhesive 308 on electrical leads 306. During manufacture, adhesive 308, initially liquid, is placed in aperture 402 (see FIG. 4B) from which electrical leads 306 extend out of casing 302. Adhesive 308 then sets, bonding the electrical leads 306 to one or more walls of aperture 402. By bonding electrical leads 306 to casing 302 in this way, a significant reduction in acoustic noise is achieved.

Adhesive 308 can be any adhesive used to bond electrical parts to one another. Such adhesives are known in the art. In some embodiments of the present invention, the adhesive is Chemiseal E-1358B from the Chemitech Inc. of Tokyo, Japan.

Figure 4A:
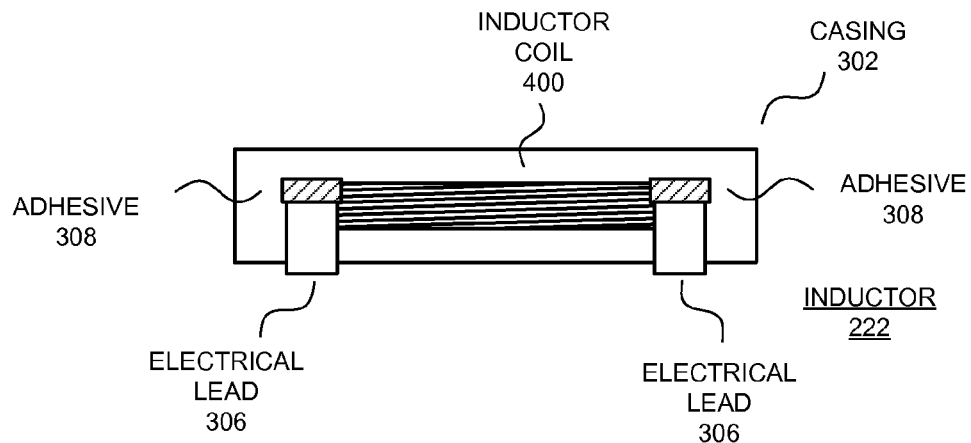
FIG. 4A presents a front view of an inductor with a casing partially cut-away to reveal the inductor coil in accordance with embodiments of the present invention.
Figure 4B:
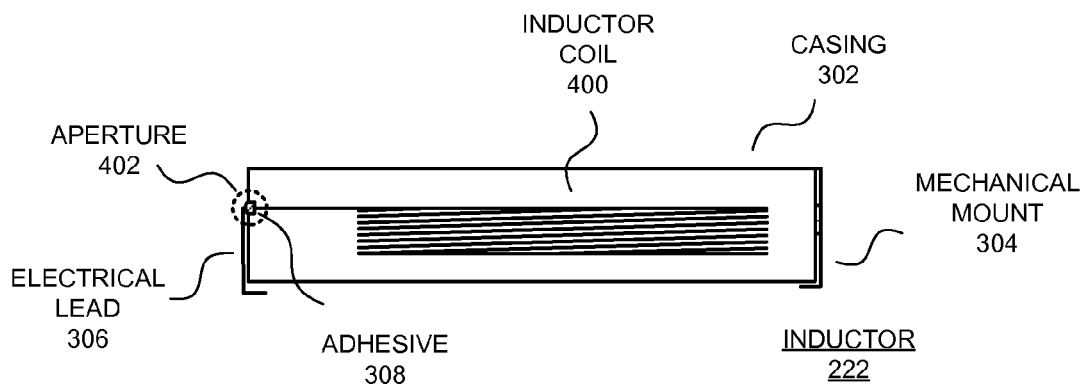
FIG. 4B presents a side view of an inductor with a casing partially cut-away to reveal the inductor coil in accordance with embodiments of the present invention.
Figure 4C:
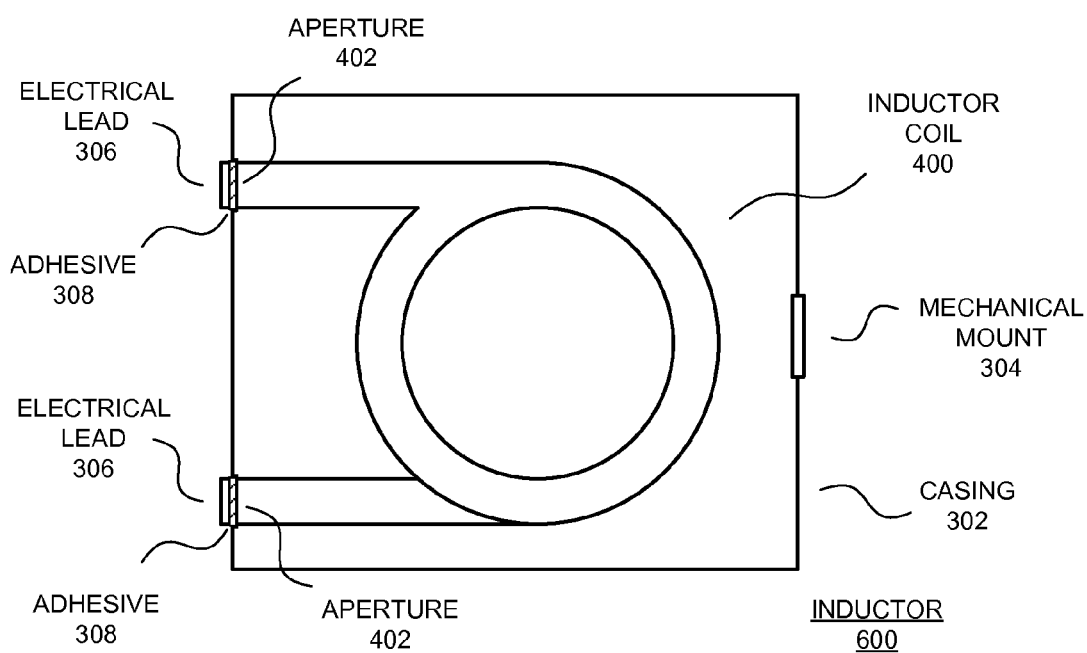
FIG. 4C presents a top view of an inductor with a casing partially cut-away to reveal the inductor coil in accordance with embodiments of the present invention.

FIGS. 4A-4C present front, side, and top partially cut-away views of inductor 222 in accordance with embodiments of the present invention. In the front view in FIG. 4A, inductor coil 400 can be seen within casing 302 (although inductor coil 400 is partially obscured by electrical leads 306).

In the side view in FIG. 4B, an electrical lead 306 can be seen extending from inductor coil 400 out of aperture 402 in casing 302 and around casing 302 in the "J"-shape described above. Adhesive 308 bonds electrical lead 306 to one or more walls of aperture 402 in casing 302. Bonding electrical leads 306 to the walls of aperture 402 stabilizes electrical leads 306, which minimizes the movement of electrical leads 306 when inductor 222 experiences high di/dt during the hybrid mode. Minimizing the movement of electrical leads 306 reduces the acoustic noise that might otherwise be produced by inductor 222.

In the top view in FIG. 4C, inductor coil 400's circular shape is visible with electrical leads extending from inductor coil out of aperture 402 in casing 302. Also shown is adhesive 308, which bonds electrical leads 306 within aperture 402.

Note that in some embodiments of the present invention, casing 302 may not include aperture 402. In these embodiments, electrical leads 306 extend directly out of the side of casing 302 and adhesive 308 can be a drop on the surface of casing 302 that surrounds electrical lead 306 (and bonds electrical lead 306 to casing 302).

Manufacturing Process

Figure 5:
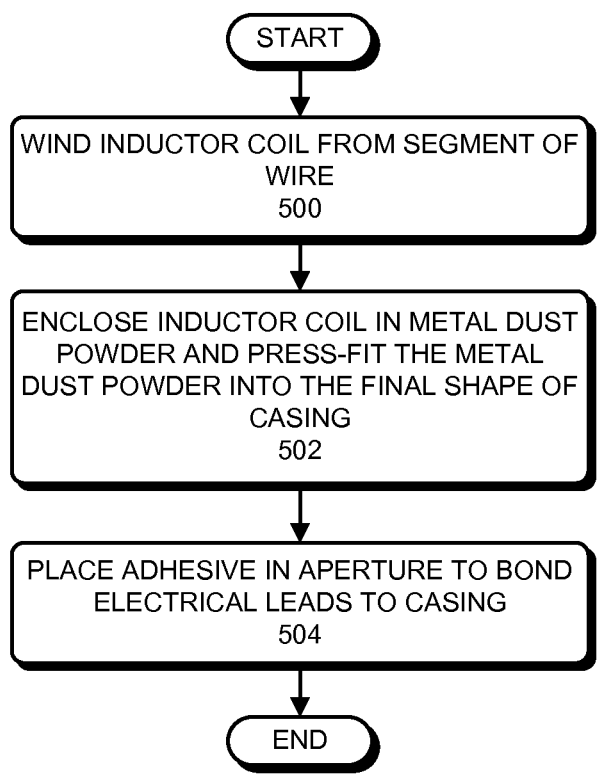
FIG. 5 presents a flowchart illustrating a method of manufacturing an inductor in accordance with embodiments of the present invention.

FIG. 5 presents a flowchart illustrating a method of manufacturing an inductor in accordance with embodiments of the present invention. The process starts when inductor coil 400 is wound from a segment of wire (step 500). Inductor coil 400 is then enclosed by metal dust powder, which is press-fit into the final shape of casing 302 (step 502). When step 502 is complete, electrical leads 306 extend from inductor coil 400 within casing 302 out of aperture 402 and around casing 302 in the "J"-shape described above.

Next, adhesive 308 is placed in aperture 402 in order to bond electrical leads 306 to casing 302 (step 504).

Alternative Embodiments

In some embodiments of the present invention, inductor 222 is entirely covered with adhesive 308. In these embodiments, as with embodiments where the adhesive is only placed in aperture 402, adhesive 308 bonds electrical leads 306 to casing 302 (as described above). These embodiments incur the cost of the additional adhesive to avoid the manufacturing step of precisely placing the correct amount of adhesive directly in apertures 402.

In some embodiments, inductor 222 is mounted by adhesively bonding the center of casing 302 to a mounting surface along with soldering or otherwise bonding electrical leads 306 and mechanical mount 304 to the mounting surface. By adhesively bonding the center of casing 302, acoustic noise is further reduced.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A power supply, comprising:
an adaptor that receives an alternating-current (AC) input signal and outputs a direct-current (DC) output signal, wherein the adaptor electrically converts the AC input signal to the DC output signal;
a charger coupled to the output of the adaptor, wherein the charger electrically converts the DC output signal to a lower-voltage DC signal and outputs the lower-voltage DC signal;
wherein the charger includes an inductor in a J-lead package, wherein a set of wires forming a set of J-leads are coupled from the inductor coil enclosed in the J-lead package to the outside of the J-lead package through corresponding apertures in a casing;
wherein each wire is bonded to a set of walls of the corresponding aperture using a bonding agent.

2. The power supply of claim 1, further comprising a set of DC-to-DC converters coupled to the output of the charger, wherein each DC-to-DC converter converts the lower-voltage DC signal to a DC signal at a predetermined voltage level.

3. The power supply of claim 1, wherein the J-lead package is formed by press-fitting metal dust powder around the inductor coil or by enclosing the inductor coil in metal dust powder and sintering.

4. The power supply of claim 1, wherein the bonding agent is a bonding agent used to bond electrical components.

5. A computer system, comprising:
a processor;
a power supply that provides power to the processor, comprising:
an adaptor that receives an alternating-current (AC) input signal and outputs a direct-current (DC) output signal, wherein the adaptor electrically converts the AC input signal to the DC output signal;

a charger coupled to the output of the adaptor, wherein the charger electrically converts the DC output signal to a lower-voltage DC signal and outputs the lower-voltage DC signal;

wherein the charger includes an inductor in a J-lead package, wherein a set of electrical leads forming a set of J-leads are coupled from the inductor coil enclosed in the J-lead package to the outside of the J-lead package through corresponding apertures in a casing;

wherein each electrical lead is bonded to a set of walls of the corresponding aperture using a bonding agent.

6. The computer system of claim 5, wherein the electrical leads extend along the casing from their corresponding apertures in the casing and under the casing alongside an outside surface of the casing, forming electrical connections for coupling the inductor to an electrical circuit.

7. The computer system of claim 5, further comprising a mechanical mount coupled to the outside of the casing on an opposite side of the casing from the apertures on the casing.

8. The computer system of claim 5, wherein the casing is formed by press-fitting metal dust powder around the inductor coil.

9. The computer system of claim 5, wherein the casing is formed by shaping and sintering metal dust powder around the inductor coil.

10. The computer system of claim 5, wherein the electrical leads are bonded with a bonding agent used to attach electrical components to one another.

11. The computer system of claim 5, wherein the power supply further comprises a set of DC-to-DC converters coupled to the output of the charger, wherein each DC-to-DC converter converts the lower-voltage DC signal to a DC signal at a predetermined voltage level.

* * * * *